United States Patent [19]

Schroeder

[11] 3,908,020

[45] Sept. 23, 1975

[54] COMPLETE FEED PRODUCT FOR PREVENTION OF MILK FEVER IN DAIRY COWS

[75] Inventor: Larry A. Schroeder, Glen Ellyn, Ill.

[73] Assignee: Swift & Company, Chicago, Ill.

[22] Filed: Sept. 23, 1974

[21] Appl. No.: 508,222

[52] U.S. Cl. .................. 426/2; 426/69; 426/136; 426/208; 426/807
[51] Int. Cl.² .................. A23K 1/22; A23K 1/18
[58] Field of Search ......... 426/2, 208, 69, 210, 807, 426/136

[56] References Cited
UNITED STATES PATENTS
3,642,489   2/1972   Bartley et al. .................. 426/69

*Primary Examiner*—James R. Hoffman
*Attorney, Agent, or Firm*—Edward T. McCabe; Charles E. Bouton; Robert E. Blankenbaker

[57] ABSTRACT

A complete feed product containing a grain source, a protein source and roughage, and characterized by having a very low calcium content (less than about 0.2% by weight). This complete feed product is fed to dairy cows prior to calving in order to prevent milk fever.

8 Claims, No Drawings

COMPLETE FEED PRODUCT FOR PREVENTION OF MILK FEVER IN DAIRY COWS

This invention relates to a complete feed product for administering to dairy cows, and to a method for preventing parturient paresis (milk fever) in dairy cows. More particularly, this invention relates to a calcium-deficient feed product which can be fed to dairy cows prior to parturition to prevent milk fever.

Parturient paresis, otherwise known as milk fever, is a metabolic disease of dairy cows associated with hypocalcemia (low blood calcium). Hypocalcemia occurs in dairy cows, to varying degrees, at the time of parturition (calving), with the most serious cases contracting milk fever. The lactation cycle of a dairy cow extends for approximately 10 months of the year immediately subsequent to calving. Lactation by dairy cows is at a minimum during the two months immediately prior to calving, and dairy cows are normally not milked during this "dry" period. The act of calving induces lactation in the dairy cow, and milk production is at a peak by 4–6 weeks thereafter.

During lactation a dairy cow normally eliminates from her body about 40 to 80 grams of calcium per day in milk and by other elimination processes. The cow replenishes body calcium from two sources. Calcium is absorbed from the cow's digestive tract and is also resorbed from the cow's skeletal system by the blood serum. The calcium is thereafter carried by the blood serum through the mammary glands where it is transferred to the milk. As mentioned, lactation is at a minimum during the two-month dry period prior to calving. Therefore, a relatively low level of calcium is depleted from body fluids and blood serum during this time. Upon calving and the onset of lactation, there is an immediate demand for high levels of calcium to be supplied by the blood serum to the mammary glands for milk production. The inability of the cow's metabolic system to provide an adequate supply of calcium to meet this demand results in parturient paresis (milk fever). Symptoms of milk fever usually manifest within one to four days after calving, with a few cases occurring before calving. Older dairy cows and Jerseys are particularly susceptible to milk fever. Symptoms include lowering of body temperature, uncoordination, and in severe cases, paralysis such that the cow cannot rise to its feet (downer cow syndrome).

Milk fever is normally treated by administering an intravenous injection of calcium borogluconate solution (about one pint) into the cow's blood stream. This usually reverses the symptoms of milk fever, and some cows can rise to their feet within minutes after treatment. However, when cows do not respond to treatment, it then becomes a time-consuming and costly operation. Also, cows exhibiting milk fever may not be milked for a period of days, and this represents a loss of production and income.

Extensive research has been conducted to determine means to prevent parturient paresis in dairy cows. It has been suggested that prepartum milking will prevent milk fever. Another suggestion involves feeding the dairy cows a dietary ration having a high calcium content prior to calving. Still another suggestion involves administering a prepartum diet high in Vitamin D. However, none of these techniques have been notably effective in eliminating parturient paresis in dairy cows.

More recently, it has been determined that parturient paresis can be controlled and/or eliminated by administering a low calcium dietary ration to dairy cows during the weeks immediately prior to calving. For example, see "The Influence of Dietary Calcium and Phosphorus on the Incidence of Milk Fever in Dairy Cattle," Journal of Dairy Science, Vol. 37 (1954); "Further Studies on the Influence of Dietary Calcium and Phosphorus on the Incidence of Milk Fever," Journal of Dairy Science, Vol. 39 (1956); and "Some Biokinetic Aspects of Calcium Metabolism in Dairy Cows," American Journal of Physiology, Vol. 189(3), 1957. Extensive research has been conducted to determine why a low calcium dietary ration would act to prevent milk fever in dairy cows. It is known that parathyroid hormone acts as a biological regulator of calcium metabolism in dairy cows, controlling the calcium level contained in the blood serum. It is believed that a low calcium diet during the dairy cow's dry period places a stress on the cow's metabolic system, causing compensatory hypertrophy of the cow's parathyroid glands, thus increasing parathyroid hormone production. Increased parathyroid hormone apparently triggers increased absorption of calcium ions by blood serum from the digestive tract, and also results in increased calcium resorption by blood serum from the cow's skeletal system (bones). Thus, upon calving and onset of lactation, sufficient calcium can be mobilized and absorbed via the blood serum to meet the increased calcium demands required by lactation.

As a result of the discovery that milk fever can be controlled and/or eliminated by administering a low calcium dietary ration to dairy cows, low calcium dietary supplements have been prepared for administering to dairy cows prior to calving. Unfortunately, there are many problems incident to the use of a low calcium dietary supplement for prevention of milk fever. For example, the dairy farmer who purchases the low calcium supplement must then go through the labor-consuming operation of combining the supplement with available roughage, such as corn silage, prior to feeding same to the dairy cow. This obviously presents a substantial problem when dealing with large dairy herds. Also, since some available roughages, such as alfalfa and other legumes, contain high calcium levels, the dairy cows may well ingest a high calcium content, not through the dietary supplement but through the roughage. Thus, the use of low calcium dietary supplements may not provide adequate control over a dairy cow's calcium intake. Moreover, if the amount of roughage which the dairy cows ingest is limited to prevent excessive calcium intake, then digestive disturbances may occur in the dairy cows. Finally, it has been discovered that prior art low calcium dietary supplements, when combined with normally available roughages such as dehydrated corn silage, are generally unpalatable to dairy cows.

In view of the foregoing, it is a primary objective of the present invention to provide an improved feed product and method to prevent parturition paresis in dairy cows.

It is another objective of the present invention to provide a complete feed product for dairy cows, which when administered for a number of days prior to parturition, will completely eliminate milk fever.

It is also an objective of the present invention to provide an improved complete feed product for dairy cows to prevent milk fever, which feed product does not require combination with available roughages, and which can serve as the sole food intake of the dairy cow during the days prior to calving.

It is a further objective of the present invention to provide an improved complete feed product for prevention of milk fever, which product is palatable to dairy cows.

The objectives of this invention are carried out by providing a complete, calcium-limiting feed ration. The product contains a grain source, a protein source and a suitable roughage. It is important to formulate the protein source, grain source and roughage such that the final feed composition has a calcium analysis of less than 0.2% per unit weight, and preferably less than 0.1% per unit weight.

The source of grain is selected from the group consisting of ground corn, cracked corn, milo, barley and mixtures thereof. All of these grain sources are relatively low in calcium content, usually from about 0.02% to 0.05% by weight. The grain source should be present in the final feed composition in an amount of from about 40% to 70% by weight. Minor amounts of relatively high level calcium grain sources or grain by-products, such as oats and wheat middlings (midds), may be used to supplement the primary grain source. However, these supplemental sources should constitute less than about 20% by weight of the total feed composition, and of course, should not result in a feed composition having a calcium level of greater than 0.2% by weight.

The protein source of the present feed composition is selected from the group consisting of urea, bean seed meal and mixtures thereof. Suitable bean seed meals include soybean meal, cottonseed meal, linseed meal, peanut meal, and rape seed meal. The protein source material should be present in an amount of from about 0.5% to 10% by weight of the final feed composition. Because bean seed meals are relatively high in calcium, usually about 0.2% by weight, it is important that their presence in the feed composition not result in a product having a calcium content of greater than 0.2% by weight.

The roughage ingredient utilized in the present feed composition is selected from the group consisting of oat hulls, peanut hulls, rice hulls, cottonseed hulls, wheat straw, low calcium grass hays and mixtures thereof. The roughage ingredient or ingredients should comprise from about 20% to 35% of the final weight of the feed composition. It is important that roughage sources having high calcium content, such as alfalfa, not be utilized in the feed composition.

Additional ingredients which may be optionally incorporated in the present feed composition include molasses, a phosphate source, salt with trace minerals, and Vitamin A. Molasses, preferably cane molasses, has a high calcium content, and therefore, is included in the feed composition in an amount not to exceed about 5% by weight. Sources of phosphate ion should not contain any substantial amounts of calcium. Suitable phosphate sources include sodium tripolyphosphate, monosodium phosphate, monoammonium phosphate, diammonium phosphate and mixtures thereof. The phosphate source is incorporated in the feed composition in an amount of less than about 1% by weight. Salt and Vitamin A may also be present in the feed composition in amounts of less than 1% by weight.

A feed composition containing the above ingredients comprises a complete feed product having roughage built-in. There is no need for the dairy farmer to combine the feed composition with a roughage source prior to feeding to his dairy herd. Moreover, this feed composition has been discovered to be uniquely palatable to dairy cows, and has overcome their resistance to dietary rations comprising low calcium feed supplements combined with corn silage.

The method of this invention comprises feeding the described complete, calcium-deficient feed product to dairy cows for a period of from about 7 to 20 days, and preferably 10 to 14 days, prior to calving, and in amounts of from about 4 to 10 kilograms per dairy cow per day depending on the cow's size.

EXAMPLE I

The following ingredients were well-blended and packaged as a complete feed product for dairy cows:

| Ingredients | Percentage by Weight |
|---|---|
| Corn - cracked or ground | 50 % |
| Oats | 7.5 % |
| Wheat midds | 5.0 % |
| Soybean meal | 6 % |
| Oat Hulls | 25 % |
| Molasses | 5.0 % |
| Urea | 0.75% |
| Sodium Tripolyphosphate | 0.75% |

EXAMPLE II

The following ingredients were well-blended and packaged as a complete feed product:

| Ingredients | Percentage by Weight |
|---|---|
| Corn, cracked or ground | 60 % |
| Oats | 7.5 % |
| Wheat Midds | 5.0 % |
| Oat Hulls | 20.2 % |
| Molasses | 5.0 % |
| Urea | 0.75% |
| Diammonium Phosphate | 0.9 % |
| Salt | 0.15% |
| Vitamin A | 0.5 % |

Dry cows selected from Jersey herds, and having a history of at least one lactation, were divided into groups. The control groups were allowed to maintain their regular diets prior to parturition. The experimental groups were fed one of the above complete feed products for 10 to 14 days prior to parturition, at a level of about 4.5 kilograms per day. Sixteen of the 51 cows on control diets were treated for parturient paresis. None of the cows on the calcium-deficient, complete feed diets developed parturient paresis.

Obviously, many modifications and variations of the invention as hereinbefore set forth may be made without departing from the spirit and scope thereof, and therefore only such limitations should be imposed as are indicated in the appended claims.

I claim:

1. A calcium-limiting, complete feed product for dairy cows comprising from about 40% to 70% by weight of a grain source selected from the group consisting of cracked corn, ground corn, milo, barley and mixtures thereof, from about 0.5% to 10% by weight of a protein source selected from the group consisting of urea, bean seed meal and mixtures thereof, and from about 20% to 35% by weight of a roughage selected from the group consisting of oat hulls, rice hulls, cottonseed hulls, peanut hulls, wheat straw, low calcium grass hays and mixtures thereof, said feed composition having a calcium content of less than about 0.2% by weight.

2. The feed composition of claim 1 wherein the roughage ingredient is oat hulls.

3. The composition of claim 1 wherein the calcium content of the feed is less than 0.1% by weight.

4. The composition of claim 1 wherein the feed contains up to about 5% by weight molasses.

5. A method for preventing milk fever in dairy cows comprising feeding from about 4 to 10 kilograms per cow per day for a period of from about 7 to 20 days prior to calving a complete, calcium-limiting feed product comprising from about 40% to 70% by weight of a grain source selected from the group consisting of cracked corn, ground corn, milo, barley and mixtures thereof, from about 0.5% to 10% by weight of a protein source selected from the group consisting of urea, bean seed meal and mixtures thereof, and from about 20% to 35% by weight of a roughage selected from the group consisting of oat hulls, rice hulls, cottonseed hulls, peanut hulls, wheat straw, low calcium grass hays and mixtures thereof, said feed composition having a calcium content of less than about 0.2% by weight.

6. The method of claim 5 wherein the roughage ingredient is oat hulls.

7. The method of claim 5 wherein the calcium content of the feed is less than 0.1% by weight.

8. The method of claim 5 wherein the dairy cows are fed the complete feed product for from 10 to 14 days prior to calving.

* * * * *